United States Patent
Kawano

(10) Patent No.: US 11,528,208 B2
(45) Date of Patent: Dec. 13, 2022

(54) GATEWAY, COMMUNICATION SYSTEM, AND COMMUNICATION METHOD

(71) Applicant: Nippon Telegraph and Telephone Corporation, Tokyo (JP)

(72) Inventor: Shinya Kawano, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/430,061

(22) PCT Filed: Jan. 29, 2020

(86) PCT No.: PCT/JP2020/003242
§ 371 (c)(1),
(2) Date: Aug. 11, 2021

(87) PCT Pub. No.: WO2020/166339
PCT Pub. Date: Aug. 20, 2020

(65) Prior Publication Data
US 2022/0141116 A1 May 5, 2022

(30) Foreign Application Priority Data
Feb. 13, 2019 (JP) .............................. JP2019-024004

(51) Int. Cl.
*H04L 43/12* (2022.01)
*H04L 43/10* (2022.01)

(52) U.S. Cl.
CPC .............. *H04L 43/12* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 6,370,656 B1* | 4/2002 | Olarig | H04L 41/142 709/201 |
| 8,285,200 B2* | 10/2012 | Backholm | H04W 76/25 370/395.2 |
| 8,489,923 B1* | 7/2013 | Lakshminarayanan | H04L 67/535 714/48 |
| 10,356,223 B1* | 7/2019 | Kuo | H04L 67/142 |
| 10,862,994 B1* | 12/2020 | Ganjam | H04L 67/1001 |

(Continued)

FOREIGN PATENT DOCUMENTS

| | | |
|---|---|---|
| JP | 2006186891 | 7/2006 |
| JP | 2010212662 | 9/2010 |
| JP | 2016099634 | 5/2016 |

OTHER PUBLICATIONS

Inomiya, "AWS IoT Device Alive Monitoring," dated Jan. 15, 2017, retrieved from URL <https://qiita.com/yokobonbon/items/a80952f5ecde3f4ed628>, 13 pages (With English Translation).

(Continued)

*Primary Examiner* — Uzma Alam
(74) *Attorney, Agent, or Firm* — Fish & Richardson P.C.

(57) ABSTRACT

An IoT device accommodation GW includes an alive monitoring time management unit and a communication unit. The alive monitoring time management unit sets a monitoring cycle for an IoT device. The communication unit transmits the monitoring cycle set by the alive monitoring time management unit to the IoT device.

10 Claims, 15 Drawing Sheets

(56) References Cited

U.S. PATENT DOCUMENTS

| | | | | |
|---|---|---|---|---|
| 2010/0211216 | A1 | 8/2010 | Morita | |
| 2012/0284385 | A1* | 11/2012 | Kavanaugh | H04L 63/029 |
| | | | | 709/223 |
| 2014/0095592 | A1* | 4/2014 | Hartrick | H04L 47/767 |
| | | | | 709/203 |
| 2014/0106796 | A1* | 4/2014 | Kim | H04L 67/55 |
| | | | | 455/466 |
| 2014/0269593 | A1* | 9/2014 | Wang | H04W 72/12 |
| | | | | 370/329 |
| 2015/0289262 | A1* | 10/2015 | Cha | H04W 76/25 |
| | | | | 370/252 |
| 2017/0187625 | A1* | 6/2017 | Nolan | H04L 67/568 |
| 2017/0332318 | A1* | 11/2017 | Vyas | H04W 12/06 |
| 2018/0150325 | A1* | 5/2018 | Kuo | G06F 9/4843 |
| 2018/0337769 | A1* | 11/2018 | Gleichauf | H04L 9/0637 |
| 2022/0006718 | A1* | 1/2022 | Heath | H04L 43/0817 |
| 2022/0075628 | A1* | 3/2022 | Adams | G06F 9/442 |

OTHER PUBLICATIONS

Karajima, "<Special feature> I found out in the experiment! LPWA's true ability," dated Jun. 15, 2017, retrieved from URL <https://businessnetwork.jp/Detail/tabid/65/artid/5450/Default.aspx>, 9 pages (With English Translation).

* cited by examiner

GATEWAY, COMMUNICATION SYSTEM, AND COMMUNICATION METHOD

CROSS-REFERENCE TO RELATED APPLICATIONS

This application is a National Stage application under 35 U.S.C. § 371 of International Application No. PCT/JP2020/003242, having an International Filing Date of Jan. 29, 2020, which claims priority to Japanese Application Serial No. 2019-024004, filed on Feb. 13, 2019. The disclosure of the prior application is considered part of the disclosure of this application, and is incorporated in its entirety into this application.

TECHNICAL FIELD

The present invention relates to a gateway, a communication system, and a communication method.

BACKGROUND ART

In recent years, the number of IoT devices has been increasing in response to diversification of IoT (Internet of things) devices connected with networks such as network cameras and televisions. In related art, as a method of alive monitoring of IoT devices, there has been a method in which an IoT device regularly transmits an alive monitoring signal to an IoT device accommodation gateway (GW) (see Non-Patent Literature 1). Further, there has been a method in which an IoT device accommodation GW regularly transmits an alive monitoring signal to an IoT device (see Non-Patent Literature 2).

CITATION LIST

Non-Patent Literature

Non-Patent Literature 1: <Special Feature> Found from Experiments! Real Capability of LPWA (column 2), [online], [retrieved Dec. 20, 2018], Internet <URL: https://businessnetwork.jp/Detail/tabid/65/artid/5450/Default.aspx>

Non-Patent Literature 2: AWS IoT Device Alive Monitoring, [online], [retrieved Dec. 20, 2018], Internet <URL: https://qiita.com/yokobonbon/items/a80952f5ecde3f4ed628>

SUMMARY OF THE INVENTION

Technical Problem

Due to an increase in the number of IoT devices, the number of data signals of IoT devices increases, and alive monitoring signals for devices increase. There has been a problem that this increases a load on an IoT device accommodation GW due to alive monitoring.

For example, in a method disclosed in Non-Patent Literature 1, an IoT device regularly transmits an alive monitoring signal to an IoT device accommodation GW. Thus, in the method disclosed in Non-Patent Literature 1, the alive monitoring signal is transmitted even in a case where a high load is applied to a system of the IoT device accommodation GW, and a load on IoT device accommodation GW increases.

Further, in the method disclosed in Non-Patent Literature 2, because an IoT device accommodation GW regularly transmits an alive monitoring signal to an IoT device, the method may not handle a case where the IoT device is in a sleep state (sleep due to a power saving function) and may thus not receive the signal.

The present invention has been made in consideration of the above circumstance, and an object is to provide a gateway, a communication system, and a communication method that realize appropriate alive monitoring even in a case where an IoT device is in a sleep state and enable reduction in a load on an IoT device accommodation GW due to alive monitoring.

Means for Solving the Problem

To solve the above-described problem and achieve the object, a gateway according to the present invention is a gateway accommodating an IoT device, the gateway including: a setting unit setting a monitoring cycle for the IoT device; and a communication unit transmitting the monitoring cycle set by the setting unit to the IoT device.

Further, a communication system according to the present invention is a communication system including: an IoT device; and a gateway accommodating the IoT device, in which the gateway includes: a setting unit setting a monitoring cycle for the IoT device; and a first communication unit transmitting the monitoring cycle set by the setting unit to the IoT device, and in which the IoT device includes a second communication unit transmitting a message to the gateway in accordance with the monitoring cycle transmitted by the first communication unit.

Effects of the Invention

The present invention realizes appropriate alive monitoring even in a case where an IoT device is in a sleep state, and enables reduction in a load on an IoT device accommodation GW due to alive monitoring.

DESCRIPTION OF EMBODIMENTS

Figure 1:
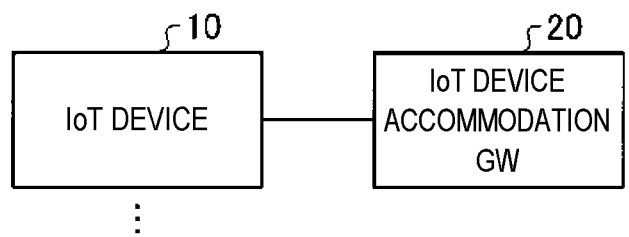
FIG. 1 is a diagram that illustrates one example of a configuration of a communication system in a first embodiment.

Embodiments of the present invention will hereinafter be described in detail with reference to drawings. Note that the present invention is not limited by the embodiments. Further, as for denotation in the drawings, the same reference characters will be given to illustrate the same elements.

First Embodiment

System Configuration

FIG. 1 is a diagram illustrating an outline configuration of a communication system according to a first embodiment. As illustrated in FIG. 1, the communication system according to the first embodiment has a plurality of IoT devices 10 and an IoT device accommodation GW 20.

The IoT device 10 is a communication apparatus provided to each kind of sensor, a camera, a home electric appliance, an automobile, a drone, or the like, for example, and being capable of communication. The IoT device 10 is accommodated in the IoT device accommodation GW 20. The IoT device 10 transmits an alive monitoring message to the IoT device accommodation GW 20 in accordance with a monitoring cycle set by the IoT device accommodation GW 20.

The IoT device accommodation GW 20 accommodates a plurality of IoT devices 10. The IoT device accommodation GW 20 sets the monitoring cycle for the IoT device 10, causes the IoT device 10 to transmit the alive monitoring message in the set monitoring cycle, and thereby performs alive monitoring of the IoT device 10. Specifically, in a case where data or the alive monitoring message is received from the IoT device, the IoT device accommodation GW 20 notifies a transmission time of the alive monitoring message to the IoT device 10. The IoT device accommodation GW 20 performs communication with an upper server, for example, a server of a service provider, via a network.

Configuration of IoT Device

Figure 2:
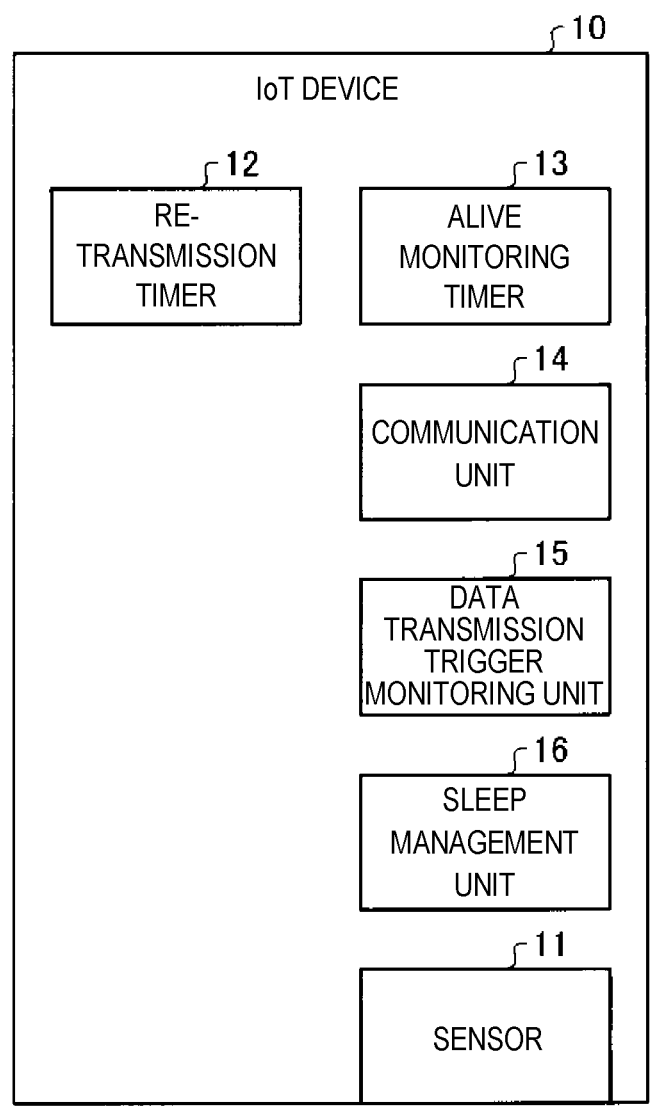
FIG. 2 is a diagram illustrating one example of a configuration of an IoT device illustrated in FIG. 1.

Next, a configuration of the IoT device 10 will be described. FIG. 2 is a diagram illustrating one example of the configuration of the IoT device 10 illustrated in FIG. 1. As illustrated in FIG. 2, the IoT device 10 has a sensor 11, a re-transmission timer 12, an alive monitoring timer 13, a communication unit 14 (second communication unit), a data transmission trigger monitoring unit 15, and a sleep management unit 16 (management unit). The IoT device 10 is realized by a sensor, a memory, a CPU, and so forth, for example.

The sensor 11 is a temperature sensor, for example. The sensor 11 outputs detected data to the data transmission trigger monitoring unit 15.

The re-transmission timer 12 is a timer for performing re-transmission in a case where an acknowledgment from the IoT device accommodation GW 20 is not made to a message that the IoT device 10 transmits to the IoT device accommodation GW 20.

The alive monitoring timer 13 manages timer data of the alive monitoring message. The timer data are data indicating the transmission time of the alive monitoring message, the transmission time being received from the IoT device accommodation GW 20. When the transmission time of the alive monitoring message, the transmission time being set by the IoT device accommodation GW 20, is reached, the communication unit 14 is caused to transmit the alive monitoring message.

The communication unit 14 performs communication with the IoT device accommodation GW 20. The communication unit 14 receives the acknowledgment from the IoT device accommodation GW 20. The acknowledgment includes the transmission time of the alive monitoring message. The communication unit 14 transmits the data detected by the sensor 11 or the alive monitoring message to the IoT device accommodation GW 20.

The data transmission trigger monitoring unit 15 performs trigger management for transmitting the data detected by the sensor 11. The data transmission trigger monitoring unit 15 is a timer, for example, and causes the communication unit 14 to transmit the data when a predetermined time elapses after previous data transmission. Further, the data transmission trigger monitoring unit 15 performs threshold value monitoring for the data detected by the sensor 11 and causes the communication unit 14 to transmit the detected data in a case where the value of the data exceeds a threshold value.

The sleep management unit 16 causes a communication function and so forth to sleep in a period in which no data communication is made. The sleep management unit 16 attempts power saving by causing the communication function and so forth to sleep from after reception of the acknowledgment from the IoT device accommodation GW 20 to the transmission time of the alive monitoring message, the transmission time being indicated by the acknowledgment.

Configuration of IoT Device Accommodation GW

Figure 3:
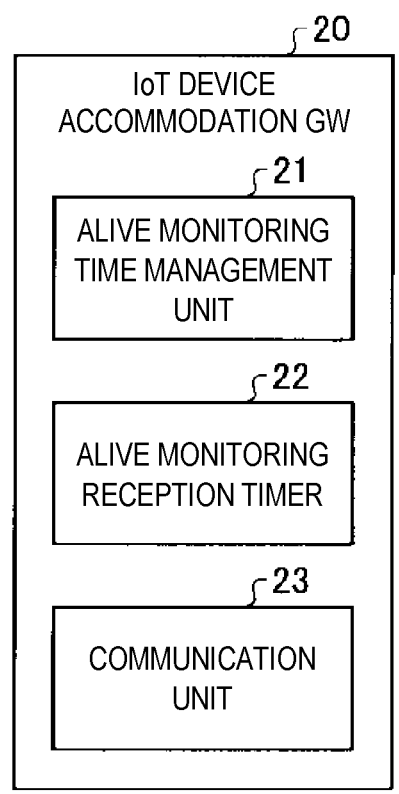
FIG. 3 is a diagram illustrating one example of a configuration of an IoT device accommodation GW illustrated in FIG. 1.

FIG. 3 is a diagram illustrating one example of a configuration of the IoT device accommodation GW 20 illustrated in FIG. 1. As illustrated in FIG. 2, the IoT device accommodation GW 20 has an alive monitoring time management unit 21 (setting unit), an alive monitoring reception timer 22, and a communication unit 23 (first communication unit).

The alive monitoring time management unit 21 manages an alive monitoring cycle for each of the IoT devices 10. For example, for each of the IoT devices 10, an alive monitoring time is registered in advance in the alive monitoring time management unit 21. For example, for a certain IoT device 10, one day as the default value is set. The alive monitoring time management unit 21 sets, for the IoT device 10, a monitoring cycle. Specifically, in a case where the data or the alive monitoring message is received from the IoT device 10, the alive monitoring time management unit 21 transmits the acknowledgment including the transmission time of the alive monitoring message to this IoT device 10.

Figure 4:
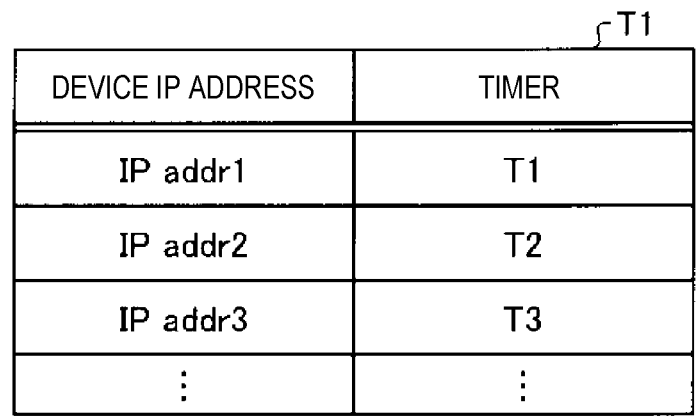
FIG. 4 is a diagram explaining time management by an alive monitoring reception timer.

The alive monitoring reception timer 22 is a timer for managing an elapsing time from data reception by the IoT device 10 for each of the IoT devices 10. FIG. 4 is a diagram explaining time management by the alive monitoring reception timer 22.

As indicated in a table T1 of FIG. 4, the alive monitoring reception timer 22 performs management by associating IP addresses of the IoT devices 10 with timer values. The alive monitoring time management unit 21 sets the value of a timer of each of the IoT devices 10 in accordance with the alive monitoring time registered in advance for each of the IoT devices 10. For example, a timer value of "T1" is set for the IoT device 10 having an IP address of "IP addr 1". The alive monitoring reception timer 22 resets the timer corresponding to the IoT device 10 at the time of data reception from the IoT device 10, and performs a decrement in accordance with a lapse of time. Alternatively, the alive monitoring reception timer 22 resets the timer corresponding to the IoT device 10 to zero at the time of data reception from the IoT device 10 and performs an increment.

The communication unit 23 performs communication with the IoT device 10. The communication unit 23 receives the data detected by the sensor 11 or the alive monitoring message from the IoT device 10. The communication unit 23 transmits the acknowledgment to the IoT device 10. The acknowledgment includes the transmission time of the alive monitoring message, the transmission time being set by the alive monitoring time management unit 21.

Processing Procedures of Alive Monitoring Process

Figure 5:
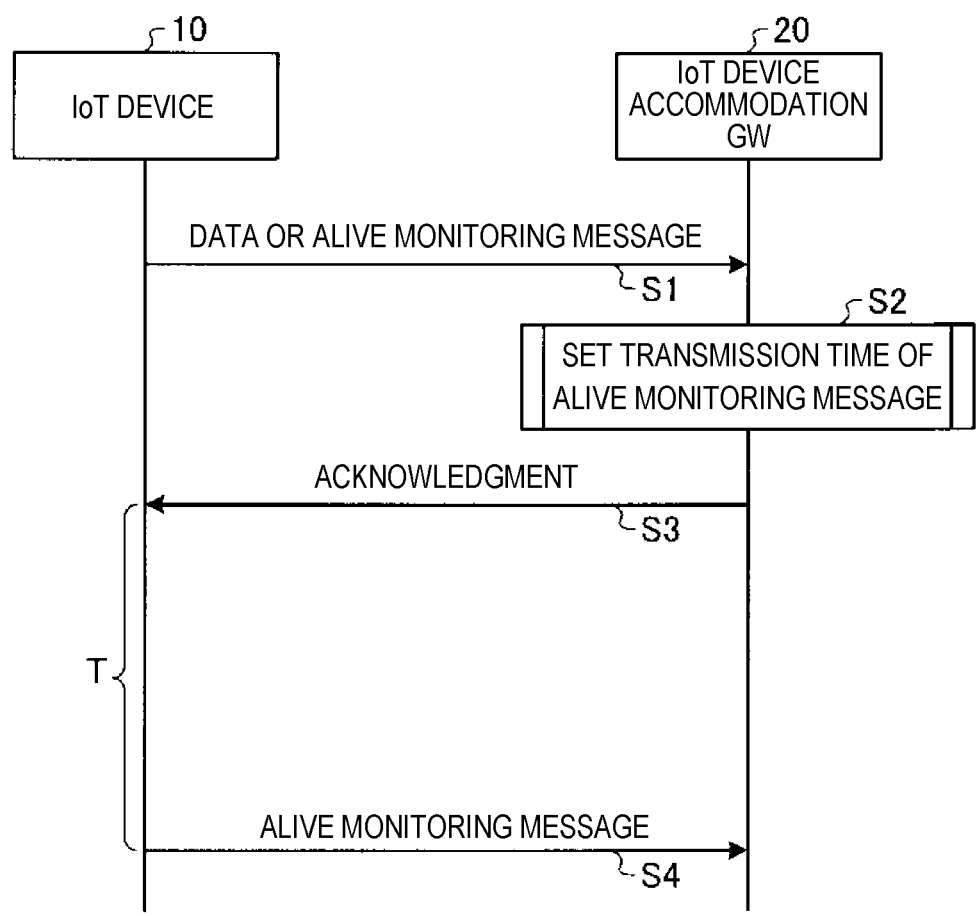
FIG. 5 is a sequence diagram illustrating one example of processing procedures of an alive monitoring process according to the first embodiment.

Next, a description will be made about processing procedures of the alive monitoring process in communication processes in the communication system illustrated in FIG. 1. FIG. 5 is a sequence diagram illustrating one example of the processing procedures of the alive monitoring process according to the first embodiment.

The IoT device 10 transmits the data or the alive monitoring message to the IoT device accommodation GW 20 (step S1). The IoT device 10 transmits the data to the IoT device accommodation GW 20 in accordance with the trigger management by the data transmission trigger monitoring unit 15. Alternatively, the IoT device 10 transmits alive monitoring data to the IoT device accommodation GW 20 when the alive monitoring timer 13 expires.

When the data or the alive monitoring message is received, the IoT device accommodation GW 20 sets the transmission time of the alive monitoring message for this IoT device 10 (step S2). The IoT device accommodation GW 20 transmits the acknowledgment including the set transmission time of the alive monitoring message to the IoT device 10 (step S3). The IoT device accommodation GW 20 may transmit, as the transmission time of the alive monitoring message, a period (monitoring cycle) T from a time of the previous transmission of the alive monitoring message to the next transmission or may transmit the transmission time point of the next alive monitoring message.

When the acknowledgment is received, the IoT device 10 transmits the alive monitoring message to the IoT device accommodation GW 20 when the period T elapses (step S4). Note that in a case where the IoT device 10 transmits the data before the period T elapses after the time of the previous transmission of the alive monitoring message, this data transmission may be used as the alive monitoring.

Effects of First Embodiment

As described above, in this first embodiment, the IoT device 10 has no signal reception in the period T until the indicated transmission time of the next alive monitoring message and may thus cause the communication function to be in a sleep state. In other words, because the IoT device 10 retains transmission timing of the next alive monitoring message, the IoT device 10 does not always have to be in a state of being capable of receiving a message from the IoT device accommodation GW 20, and sleep becomes possible.

Further, in this first embodiment, the IoT device accommodation GW 20 sets the monitoring cycle for each of the IoT devices 10. That is, the IoT device accommodation GW 20 may freely set the transmission time of the alive monitoring message for each of the IoT devices 10. In other words, the IoT device accommodation GW 20 may spread the transmission timings of the alive monitoring messages for each of the IoT devices 10 such that reception timings of the alive monitoring messages do not overlap with each other.

Thus, in this first embodiment, compared to a case where each of the IoT devices 10 regularly transmits the alive monitoring message at fixed timings, a load on the IoT device accommodation GW 20 due to the alive monitoring may be spread. As a result, this first embodiment enables reduction in the load on the IoT device accommodation GW 20 due to the alive monitoring.

One Example of Processing Procedures of Alive Monitoring Process

Figure 6:
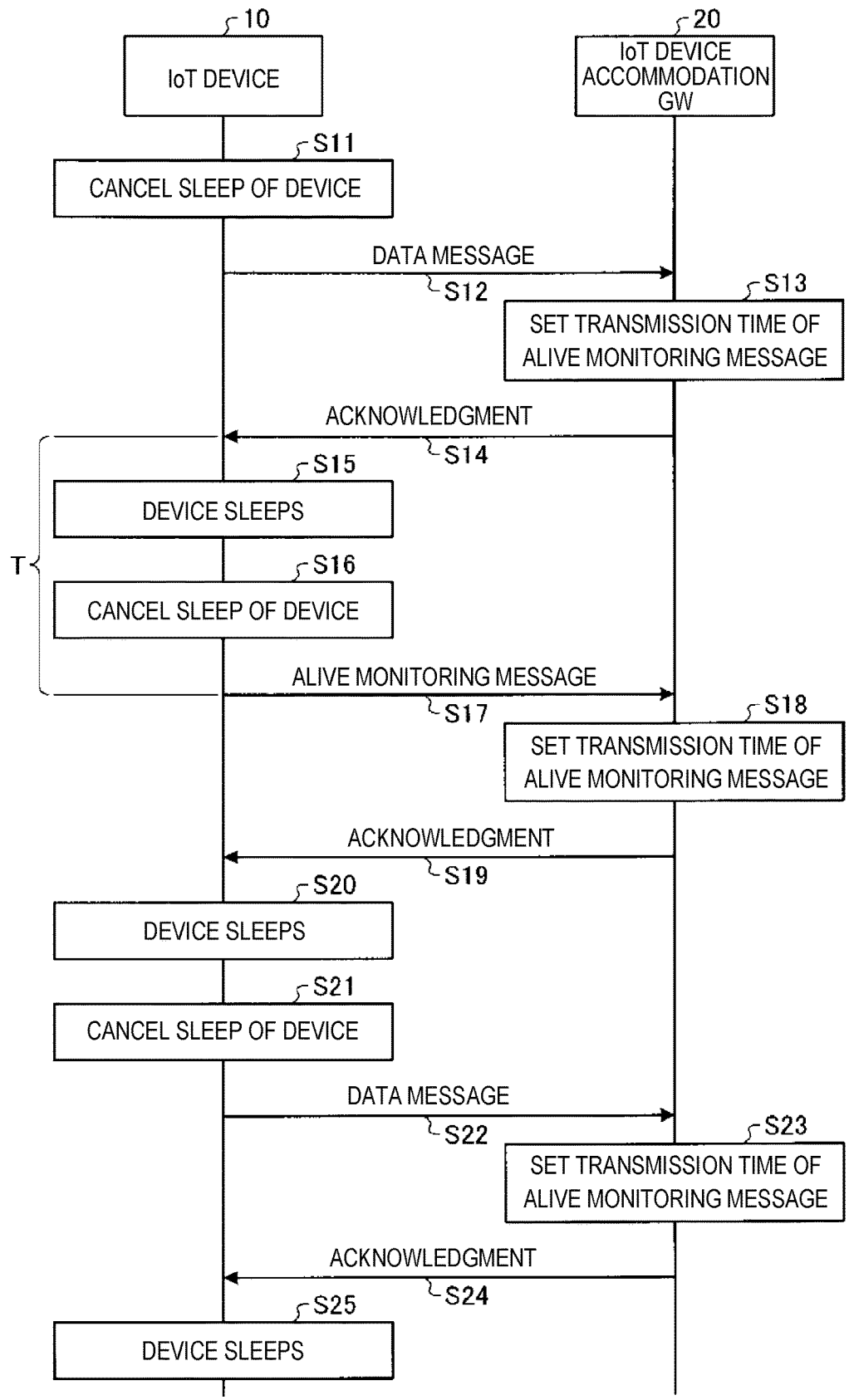
FIG. 6 is a sequence diagram illustrating one example of the processing procedures of the alive monitoring process according to the first embodiment.

Next, a description will be made about one example of the alive monitoring process in the communication system illustrated in FIG. 1. FIG. 6 is a sequence diagram illustrating one example of processing procedures of the alive monitoring process according to the first embodiment. In FIG. 6, a description will be made about a process in a case where the IoT device 10 transmits a data message to the IoT device accommodation GW 20.

The IoT device 10 cancels sleep in accordance with the trigger management by the data transmission trigger monitoring unit 15 (step S11) and transmits the data message to the IoT device accommodation GW 20 (step S12).

When the data message is received, similarly to step S2, the IoT device accommodation GW 20 sets the transmission time of the alive monitoring message for this IoT device 10 (step S13). The IoT device accommodation GW 20 transmits the acknowledgment including the set transmission time of the alive monitoring message to the IoT device 10 (step S14).

The IoT device 10 sleeps when the acknowledgment is received (step S15), cancels sleep when the period T elapses (step S16), and transmits the alive monitoring message to the IoT device accommodation GW 20 (step S17).

When the alive monitoring message is received, similarly to step S2, the IoT device accommodation GW 20 sets the transmission time of the alive monitoring message for this IoT device 10 (step S18). The IoT device accommodation GW 20 transmits the acknowledgment including the set transmission time of the alive monitoring message to the IoT device 10 (step S19).

When the acknowledgment is received, the IoT device 10 sleeps (step S20). In a case where the data are transmitted before the period T elapses after the previous transmission of the alive monitoring message, the IoT device 10 cancels sleep (step S21) and transmits the data message as the alive monitoring (step S22).

When the data message is received, similarly to step S2, the IoT device accommodation GW 20 sets the transmission time of the alive monitoring message for this IoT device 10 (step S23). The IoT device accommodation GW 20 transmits the acknowledgment including the set transmission time of the alive monitoring message to the IoT device 10 (step S24). When the acknowledgment is received, the IoT device 10 sleeps (step S25).

Another Example of Processing Procedures of Alive Monitoring Process

Figure 7:
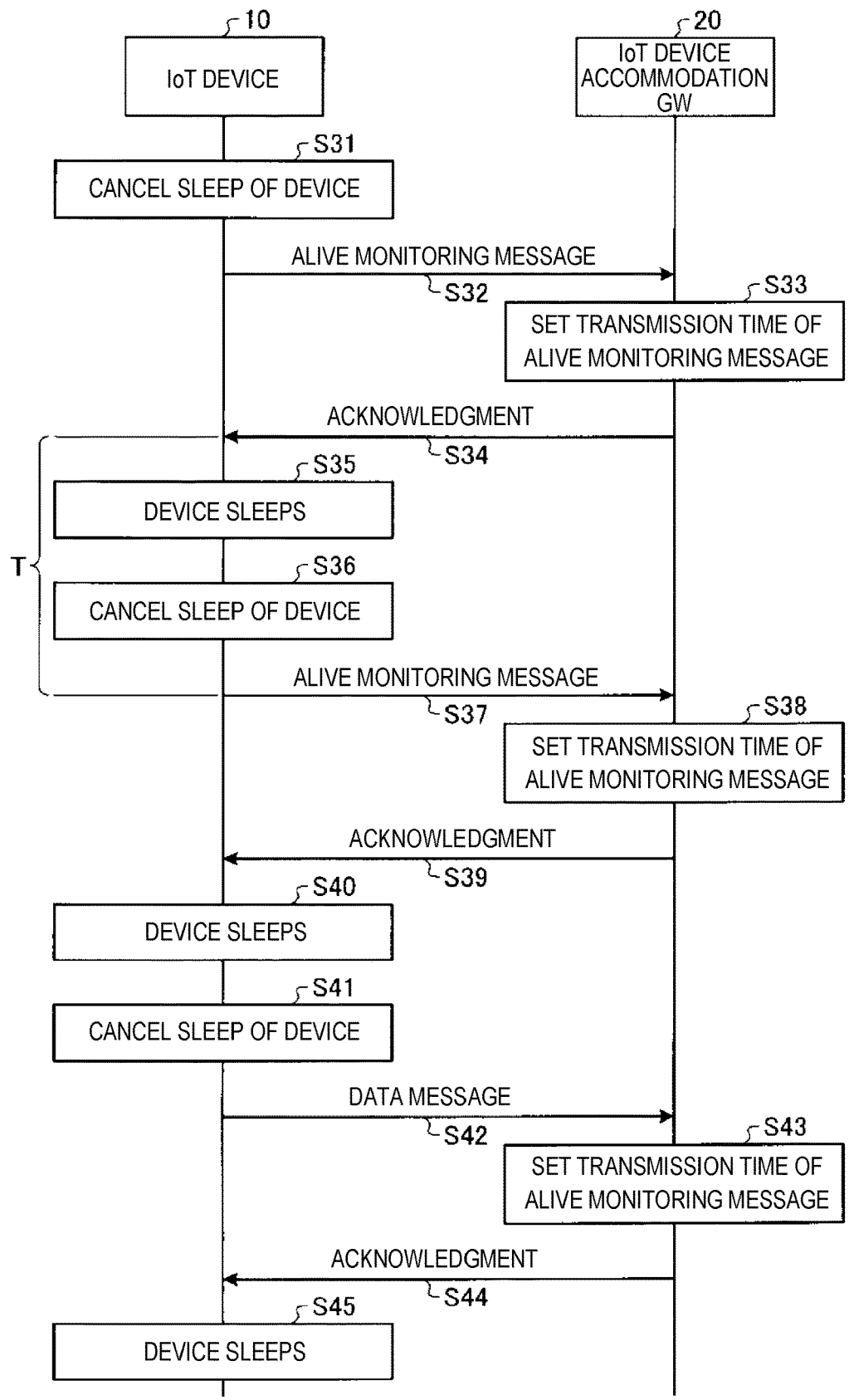
FIG. 7 is a sequence diagram illustrating one example of the processing procedures of the alive monitoring process according to the first embodiment.

Next, a description will be made about another example of the alive monitoring process in the communication system illustrated in FIG. 1. FIG. 7 is a sequence diagram illustrating one example of the processing procedures of the alive monitoring process according to the first embodiment. In FIG. 7, a description will be made about a process in a case where the IoT device 10 transmits the alive monitoring message to the IoT device accommodation GW 20.

The IoT device 10 cancels sleep in response to expiration of the alive monitoring timer 13 (step S31) and transmits the alive monitoring message to the IoT device accommodation GW 20 (step S32).

When the data message is received, similarly to step S2, the IoT device accommodation GW 20 sets the transmission time of the alive monitoring message for this IoT device 10 (step S33) and transmits the acknowledgment including the set transmission time of the alive monitoring message to the IoT device 10 (step S34). Step S35 to step S45 illustrated in FIG. 7 are the same processes as step S15 to step S25 illustrated in FIG. 6.

Another Example of Processing Procedures of Alive Monitoring Process

Figure 8:
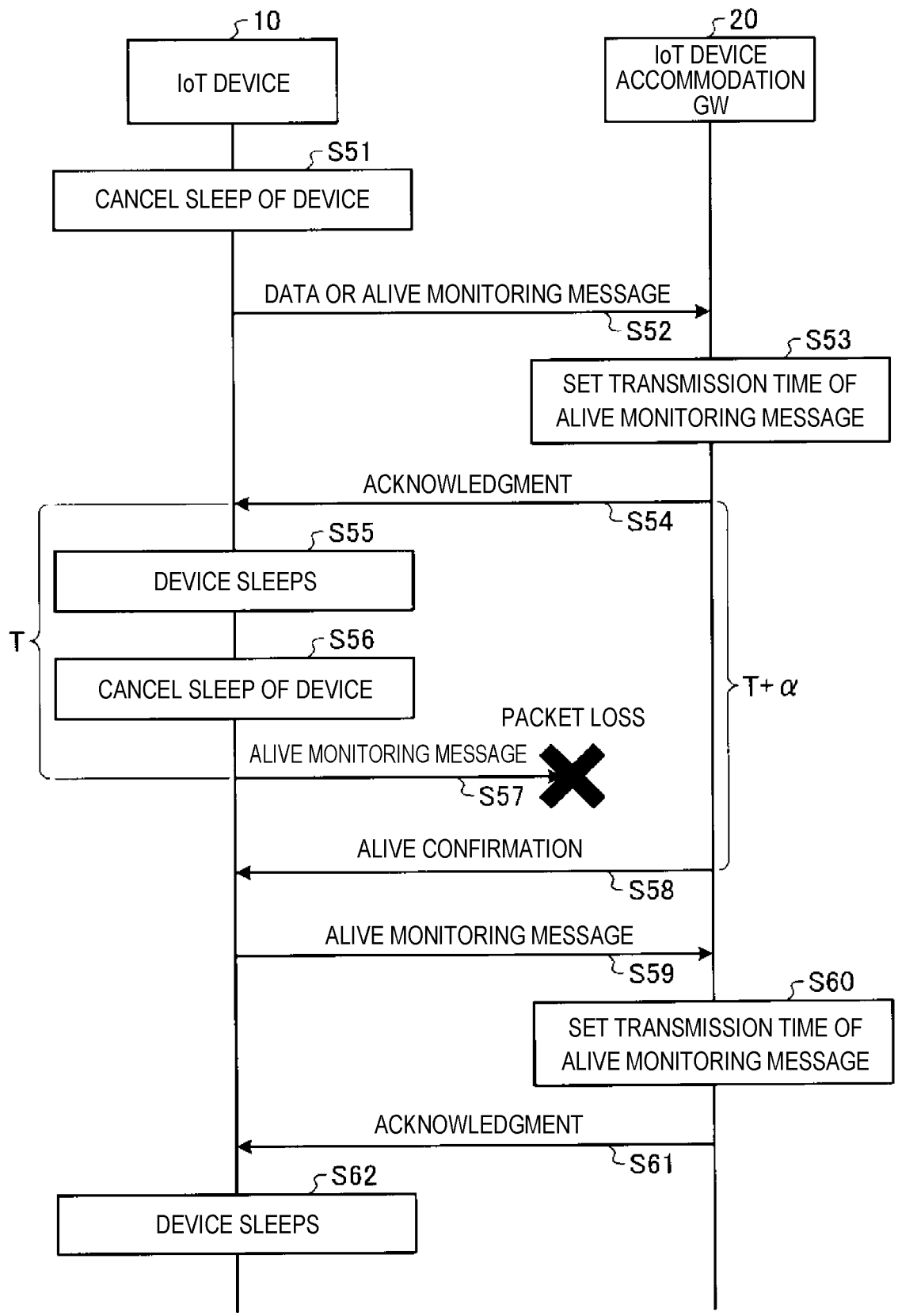
FIG. 8 is a sequence diagram illustrating one example of processing procedures of the alive monitoring process according to the first embodiment.

Next, a description will be made about another example of the alive monitoring process in the communication system illustrated in FIG. 1. FIG. 8 is a sequence diagram illustrating one example of the processing procedures of the alive monitoring process according to the first embodiment. In FIG. 8, a description will be made about a process in a case where the alive monitoring message by the IoT device 10 is not delivered to the IoT device accommodation GW 20.

The IoT device 10 cancels sleep in accordance with the trigger management by the data transmission trigger monitoring unit 15 or with expiration of the alive monitoring timer 13 (step S51). Then, the IoT device 10 transmits the data or the alive monitoring message to the IoT device accommodation GW 20 (step S52).

When the data or the alive monitoring message is received, similarly to step S2, the IoT device accommodation GW 20 sets the transmission time of the alive monitoring message for this IoT device 10 (step S53). The IoT device accommodation GW 20 transmits the acknowledgment including the set transmission time of the alive monitoring message to the IoT device 10 (step S54).

The IoT device 10 sleeps when the acknowledgment is received (step S55), cancels sleep when the period T elapses (step S56), and transmits the alive monitoring message to the IoT device accommodation GW 20 (step S57). A description will be made about a process in a case where the alive monitoring message is not delivered to the IoT device accommodation GW 20 due to packet loss in this case.

When (T+α) elapses, the IoT device accommodation GW 20 transmits an alive confirmation to the IoT device 10 in which the alive monitoring message is not received (step S58). Note that a term α is set in accordance with a delay state or a processing capability of the IoT device accommodation GW 20.

The IoT device 10 does not receive the acknowledgment. Thus, the IoT device 10 does not sleep and is capable of receiving the alive confirmation and of continuing the subsequent alive monitoring process. The IoT device 10 transmits the alive monitoring message to the IoT device accommodation GW 20 in response to the alive confirmation (step S59).

When this alive monitoring message is received, the IoT device accommodation GW 20 sets the transmission time of the alive monitoring message for this IoT device 10 (step S60). The IoT device accommodation GW 20 transmits the acknowledgment including the set transmission time of the alive monitoring message to the IoT device 10 (step S61). When the acknowledgment is received, the IoT device 10 sleeps (step S62).

Another Example of Processing Procedures of Alive Monitoring Process

Figure 9:
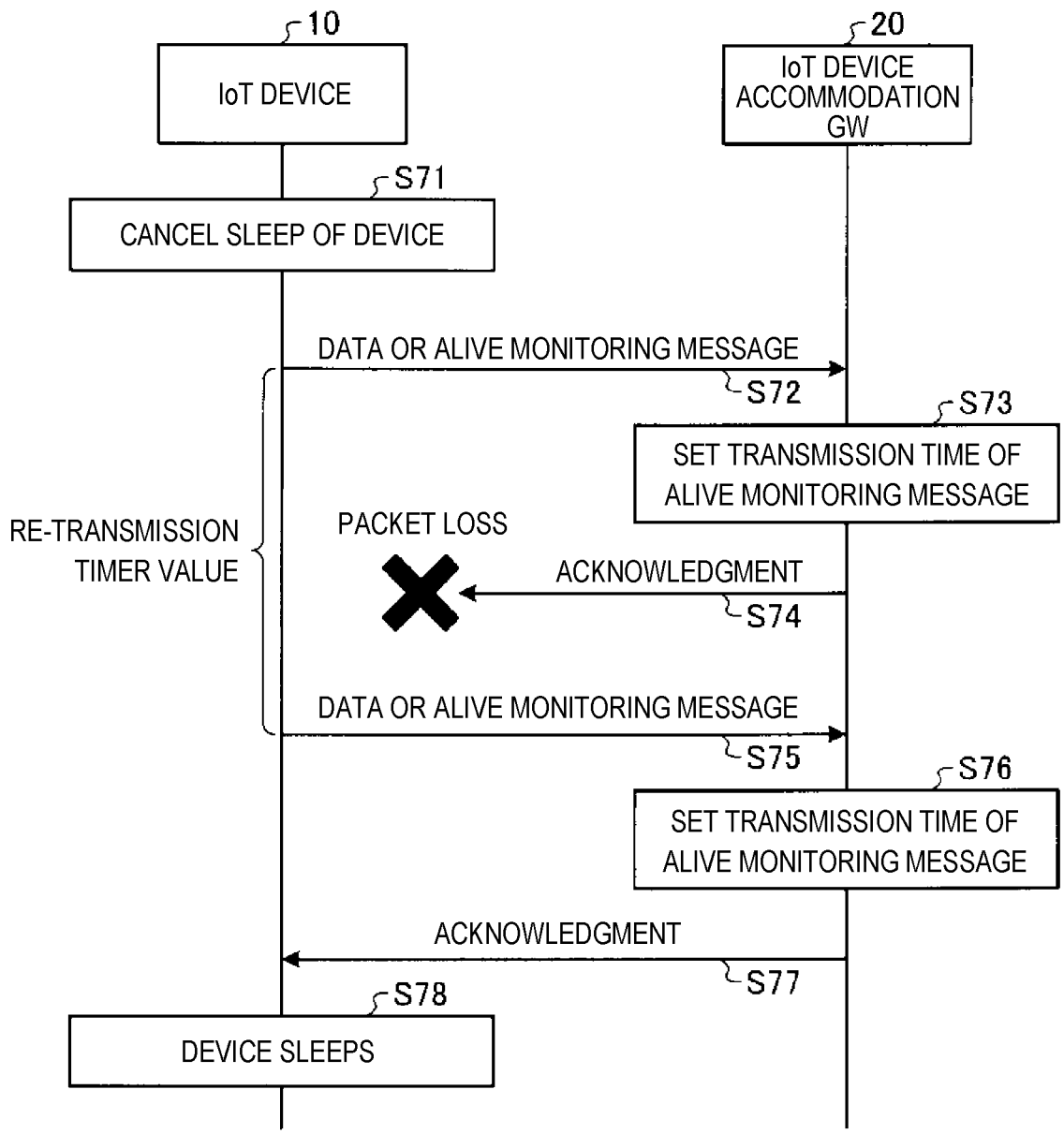
FIG. 9 is a sequence diagram illustrating one example of the processing procedures of the alive monitoring process according to the first embodiment.

Next, a description will be made about another example of the alive monitoring process in the communication system illustrated in FIG. 1. FIG. 9 is a sequence diagram illustrating one example of the processing procedures of the alive monitoring process according to the first embodiment. In FIG. 9, a description will be made about a process in a case where the acknowledgment by the IoT device accommodation GW 20 is not delivered to the IoT device 10.

The IoT device 10 cancels sleep in accordance with the trigger management by the data transmission trigger monitoring unit 15 (step S71) and transmits the data or the alive monitoring message to the IoT device accommodation GW 20 (step S72).

When the data or the alive monitoring message is received, similarly to step S2, the IoT device accommodation GW 20 sets the transmission time of the alive monitoring message for this IoT device 10 (step S73). The IoT device accommodation GW 20 transmits the acknowledgment including the set transmission time of the alive monitoring message to the IoT device 10 (step S74). A description will be made about a process in a case where the acknowledgment is not delivered to the IoT device 10 due to packet loss in this case.

After a re-transmission timer value elapses from the previous transmission of the data or the alive monitoring message, the IoT device 10 transmits the data or the alive monitoring message to the IoT device accommodation GW 20 (step S75). In this case, the number of re-transmissions by the IoT device 10 may be defined. The IoT device 10 does not receive the acknowledgment. Thus, the IoT device 10 does not sleep, may re-transmit the data or the alive monitoring message in accordance with the re-transmission timer 12, and is thus capable of continuing the subsequent alive monitoring process.

Then, when the data or alive monitoring message is received, the IoT device accommodation GW 20 sets the transmission time of the alive monitoring message for this IoT device 10 (step S76). The IoT device accommodation GW 20 transmits the acknowledgment including the set transmission time of the alive monitoring message to the IoT device 10 (step S77). When the acknowledgment is received, the IoT device 10 sleeps (step S78).

Second Embodiment

Figure 10:
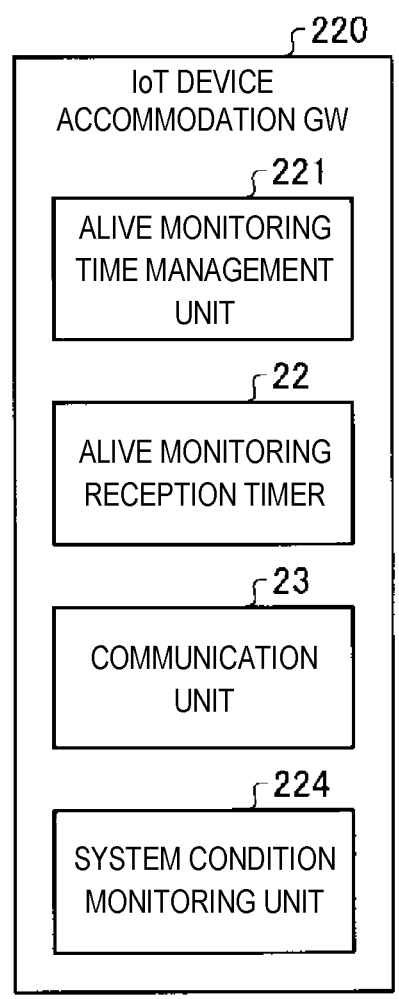
FIG. 10 is a diagram illustrating one example of a configuration of an IoT device accommodation GW according to a second embodiment.

Next, a second embodiment will be described. FIG. 10 is a diagram illustrating one example of a configuration of an IoT device accommodation GW according to the second embodiment. A communication system according to the second embodiment has an IoT device accommodation GW 220 illustrated in FIG. 10 instead of the IoT device accommodation GW 20.

Configuration of IoT Device Accommodation GW

As illustrated in FIG. 10, compared to the IoT device accommodation GW 20, the IoT device accommodation GW 220 further has a system condition monitoring unit 224 (monitoring unit). Further, the IoT device accommodation GW 220 has an alive monitoring time management unit 221 instead of the alive monitoring time management unit 21 in the IoT device accommodation GW 20.

The system condition monitoring unit 224 monitors a system load on the IoT device accommodation GW 220. The alive monitoring time management unit 221 sets the monitoring cycle in accordance with the system load on the IoT device accommodation GW 220.

One Example of Processing Procedures of Alive Monitoring Process

Figure 11:
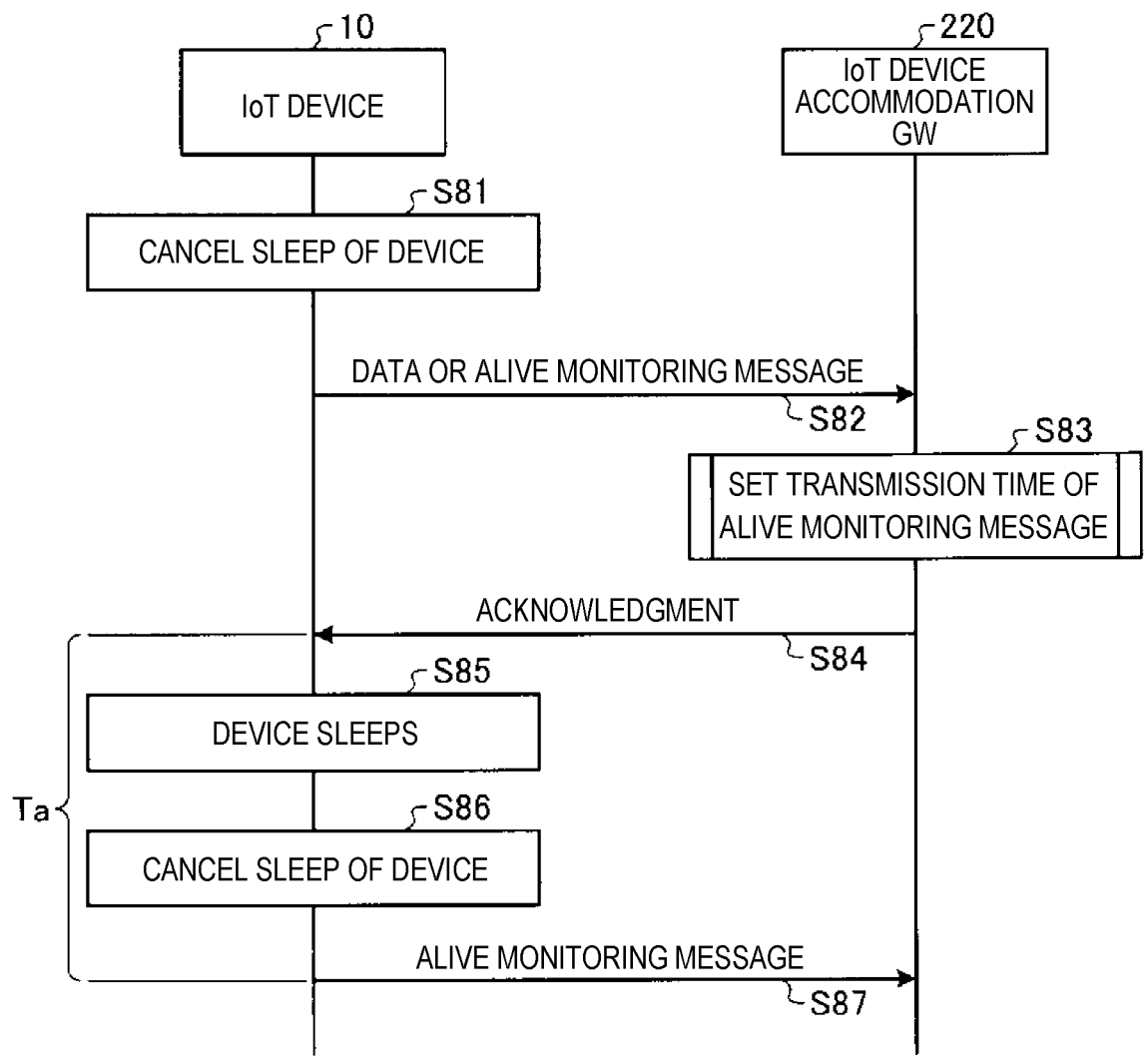
FIG. 11 is a sequence diagram illustrating one example of processing procedures of an alive monitoring process according to the second embodiment.

A description will be made about processing procedures of the alive monitoring process in communication processes in the communication system according to the second embodiment. FIG. 11 is a sequence diagram illustrating one example of the processing procedures of the alive monitoring process according to the second embodiment.

The IoT device 10 cancels sleep in accordance with the trigger management by the data transmission trigger monitoring unit 15 or with expiration of the alive monitoring timer 13 (step S81). Then, the IoT device 10 transmits the data or the alive monitoring message to the IoT device accommodation GW 20 (step S82).

When the data or the alive monitoring message is received, the IoT device accommodation GW 220 performs a transmission time setting process of the alive monitoring message for setting the transmission time of the alive monitoring message for this IoT device 10 (step S83). The IoT device accommodation GW 220 sets a transmission time Ta of the alive monitoring message in accordance with the system load on the IoT device accommodation GW 220. The IoT device accommodation GW 220 transmits the acknowledgment including the set transmission time Ta of the alive monitoring message to the IoT device 10 (step S84).

The IoT device 10 sleeps when the acknowledgment is received (step S85), cancels sleep when a period Ta elapses (step S86), and transmits the alive monitoring message to the IoT device accommodation GW 20 (step S87).

Figure 12:
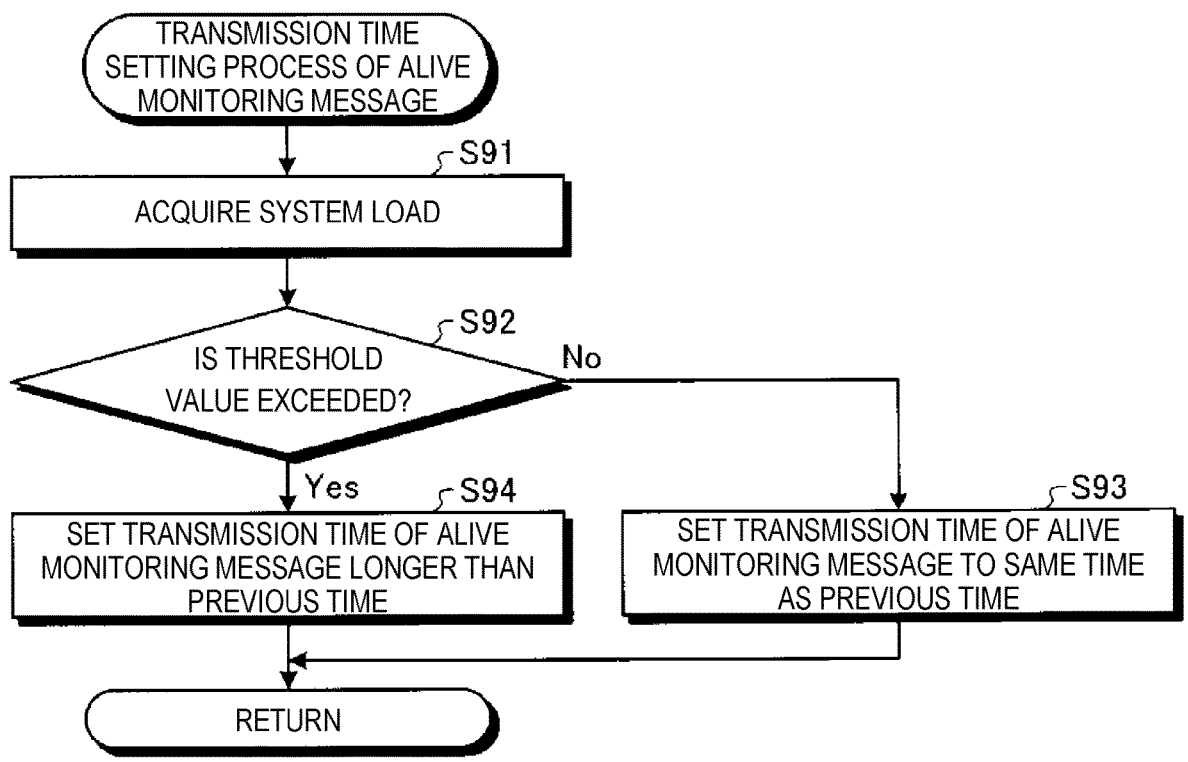
FIG. 12 is a flowchart illustrating one example of a transmission time setting process of the alive monitoring message, the transmission time setting process being illustrated in FIG. 11.

Processing Procedures of Transmission Time Setting Process of Alive Monitoring Message Next, a description will be made about processing procedures of the transmission time setting process (step S83) of the alive monitoring message, the transmission time setting process being illustrated in FIG. 11. FIG. 12 is a flowchart illustrating one example of the transmission time setting process of the alive monitoring message, the transmission time setting process being illustrated in FIG. 11.

In the IoT device accommodation GW 220, the system condition monitoring unit 224 monitors the system load on the IoT device accommodation GW 220 and acquires the system load on the IoT device accommodation GW 220 (step S91). Then, the alive monitoring time management unit 221 determines whether or not the acquired system load exceeds a predetermined threshold value (step S92). For example, as the threshold value, a CPU use rate of 60% is set.

In a case where it is determined that the acquired system load is the predetermined threshold value or smaller (step S92: No), the alive monitoring time management unit 221 sets the next transmission time of the alive monitoring message of the IoT device 10 to the same time as the previous transmission time (step S93). That is, the IoT device accommodation GW 220 sets the next monitoring cycle for the IoT device to the same cycle as the previous monitoring cycle.

In a case where it is determined that the acquired system load exceeds the predetermined threshold value (step S92: Yes), the alive monitoring time management unit 221 sets the next transmission time of the alive monitoring message of the IoT device 10 to a longer time than the previous transmission time (step S94). That is, the alive monitoring time management unit 221 sets the next monitoring cycle for the IoT device 10 longer than the previous monitoring cycle. For example, the alive monitoring time management unit 221 sets the next monitoring cycle for the IoT device 10 to a period twice the previous monitoring cycle. The next monitoring cycle for the IoT device 10 may be set to a period 10 times the usual monitoring cycle.

Another Example of Processing Procedures of Alive Monitoring Process

Figure 13:
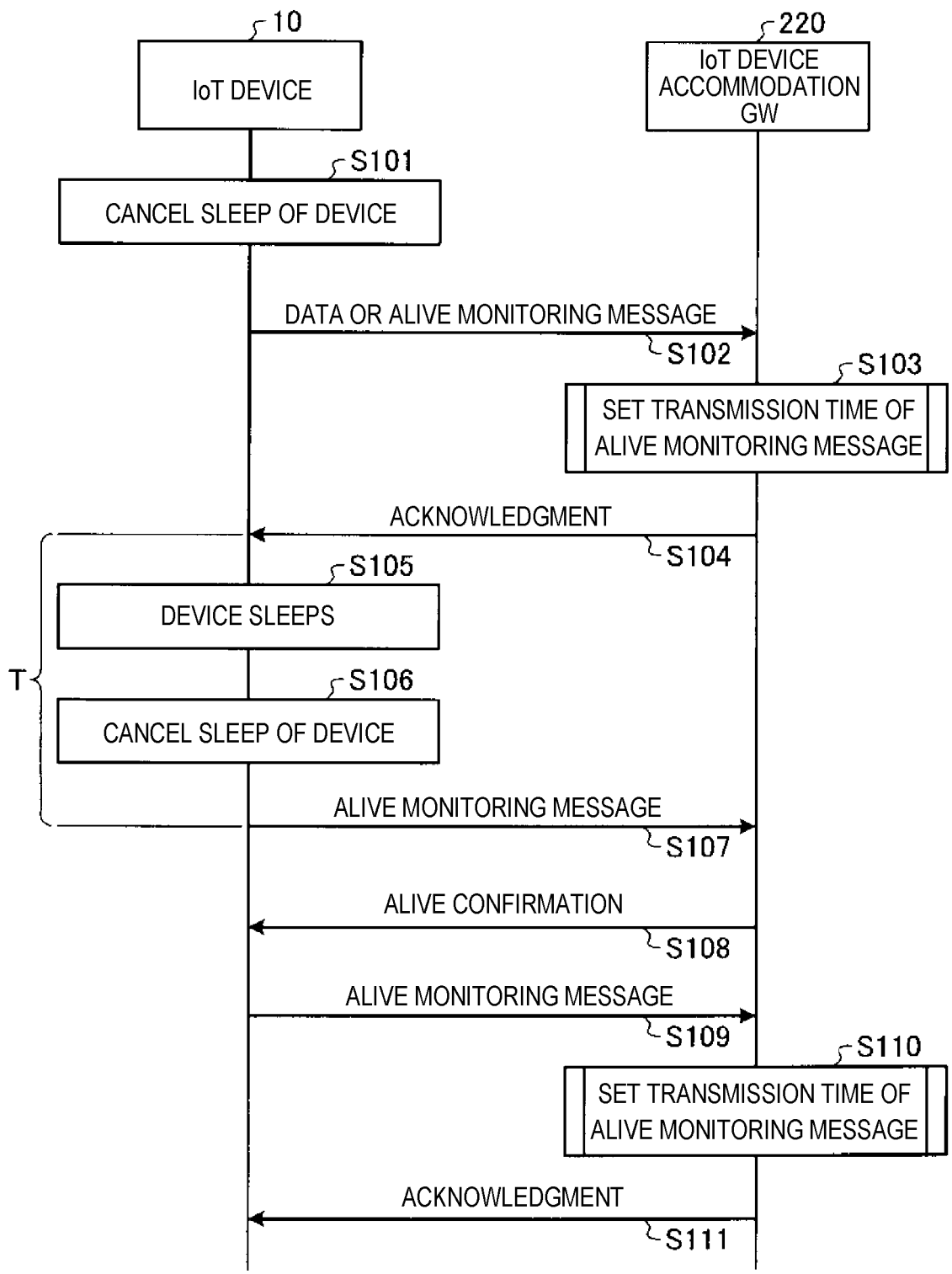
FIG. 13 is a sequence diagram illustrating another example of the processing procedures of the alive monitoring process according to the second embodiment.

A description will be made about other processing procedures of the alive monitoring process in the communication processes in the communication system according to the second embodiment. FIG. 13 is a sequence diagram illustrating another example of the processing procedures of the alive monitoring process according to the second embodiment.

Step S101 and step S102 illustrated in FIG. 13 are the same processes as step S81 and step S82 illustrated in FIG. 11.

When the data or alive monitoring message is received, the IoT device accommodation GW 220 performs a process of setting the transmission time of the alive monitoring message for this IoT device 10 (step S103). The IoT device accommodation GW 220 sets a transmission time T of the alive monitoring message or sets stop of transmission of the alive monitoring message for the IoT device in accordance with the system load on the IoT device accommodation GW 220. The IoT device accommodation GW 220 transmits the acknowledgment including a setting content about transmission of the alive monitoring message to the IoT device 10 (step S104).

First, a description will be made about a case where the IoT device 10 receives the acknowledgment including the transmission time T of the alive monitoring message. In this case, the IoT device 10 sleeps (step S105), cancels sleep when the period T elapses (step S106), and transmits the alive monitoring message to the IoT device accommodation GW 20 (step S107).

A description will be made about a case where the IoT device 10, on the other hand, receives the acknowledgment including the stop of transmission of the alive monitoring message. In this case, the IoT device 10 does not sleep so as to be capable of receiving the alive monitoring from the IoT device accommodation GW 220. Then, when the alive monitoring from the IoT device accommodation GW 220 is received (step S108), the IoT device 10 transmits the alive monitoring message to the IoT device accommodation GW 220 (step S109). Then, when the alive monitoring message is received, the IoT device accommodation GW 220 performs the same process as step S103 and performs the process of setting the transmission time of the alive monitoring message for this IoT device 10 (step S110). The IoT device accommodation GW 220 transmits the acknowledgment including the setting content about transmission of the alive monitoring message to the IoT device 10 (step S111).

Figure 14:
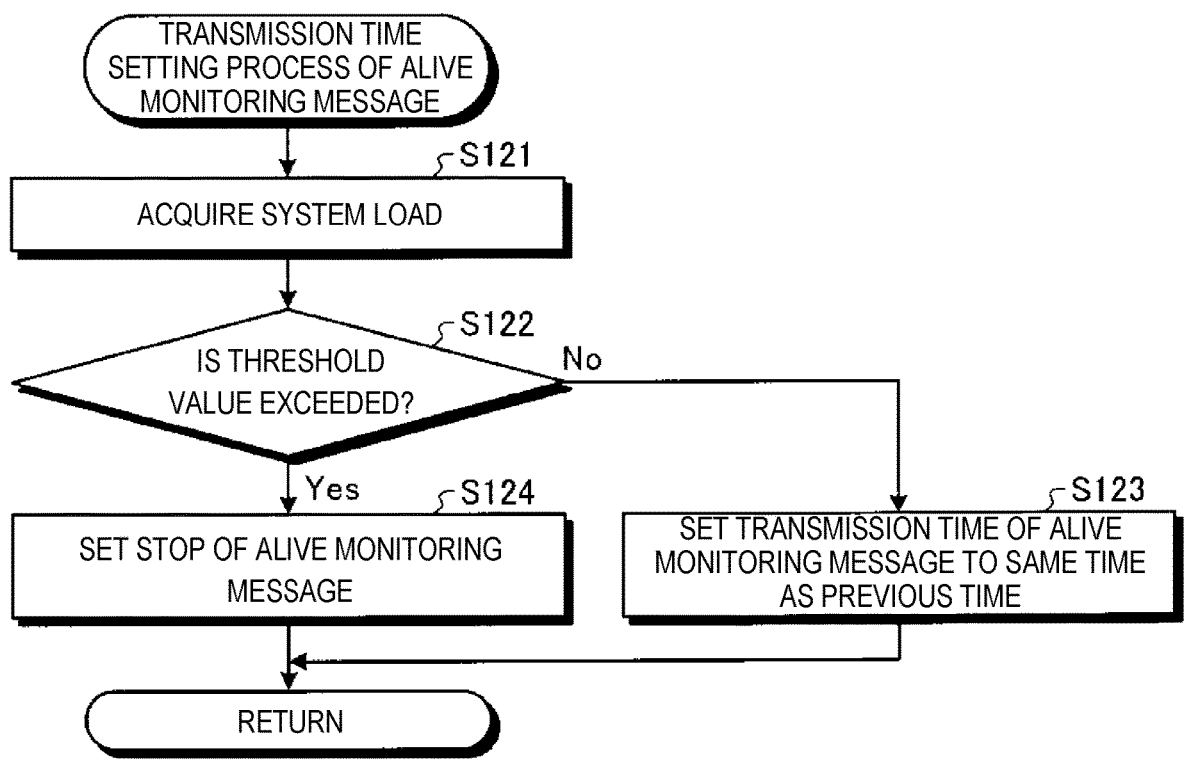
FIG. 14 is a flowchart illustrating one example of a transmission time setting process of the alive monitoring message, the transmission time setting process being illustrated in FIG. 13.

Processing Procedures of Transmission Time Setting Process of Alive Monitoring Message Next, a description will be made about processing procedures of the transmission time setting process (step S103) of the alive monitoring message, the transmission time setting process being illustrated in FIG. 13. FIG. 14 is a flowchart illustrating one example of the transmission time setting process of the alive monitoring message, the transmission time setting process being illustrated in FIG. 13.

Step S121 to step S123 illustrated in FIG. 13 are the same processes as step S91 to step S93 illustrated in FIG. 11. In a case where it is determined that the acquired system load exceeds the predetermined threshold value (step S122: Yes), the alive monitoring time management unit 221 temporarily sets the stop of transmission of the alive monitoring message for the IoT device 10 (step S124). For example, in order to temporarily stop the alive monitoring, the alive monitoring time management unit 221 assumes that "−1" as a period corresponds to infinity and sets this value as the transmission time of the alive monitoring message.

Effects of Second Embodiment

As described above, in the second embodiment, the IoT device accommodation GW 220 sets the monitoring cycle for the IoT device 10 in accordance with the system load on the IoT device accommodation GW 220 itself. For example, in the second embodiment, the IoT device accommodation GW 220 sets long the subsequent monitoring cycle for the IoT device 10 when the system load is high, indicates to the IoT device 10 by the acknowledgment, and may thus reduce an influence on the system load. Alternatively, the IoT device accommodation GW 220 sets the stop of transmission of the alive monitoring message for the IoT device when the system load is high and may thus reduce an influence on the system load.

System Configuration and so Forth

Configuration elements of apparatuses in the drawings are functionally conceptual elements and do not necessarily have to be physically configured as the drawings. That is, specific forms of distribution and integration of the apparatuses are not limited to the forms in the drawings, and all or portions thereof may be configured by functionally or physically distributing or integrating them in any unit in accordance with various kinds of loads, use situations, and so forth. Furthermore, as for processing functions performed in the apparatuses, all or any portions thereof may be realized by a CPU (central processing unit) and a program analyzed and executed by the CPU or may be realized as hardware by wired logic.

Further, among the processes described in the present embodiments, all or portions of the processes explained as being automatically performed may manually be performed, or all or portions of the processes explained as being manually performed may automatically be performed by a known method. In addition, process procedures, control procedures, specific names, and information including various kinds of data and parameters, which are described in the above document and the drawings, may arbitrarily be changed unless otherwise mentioned.

Program

Figure 15:
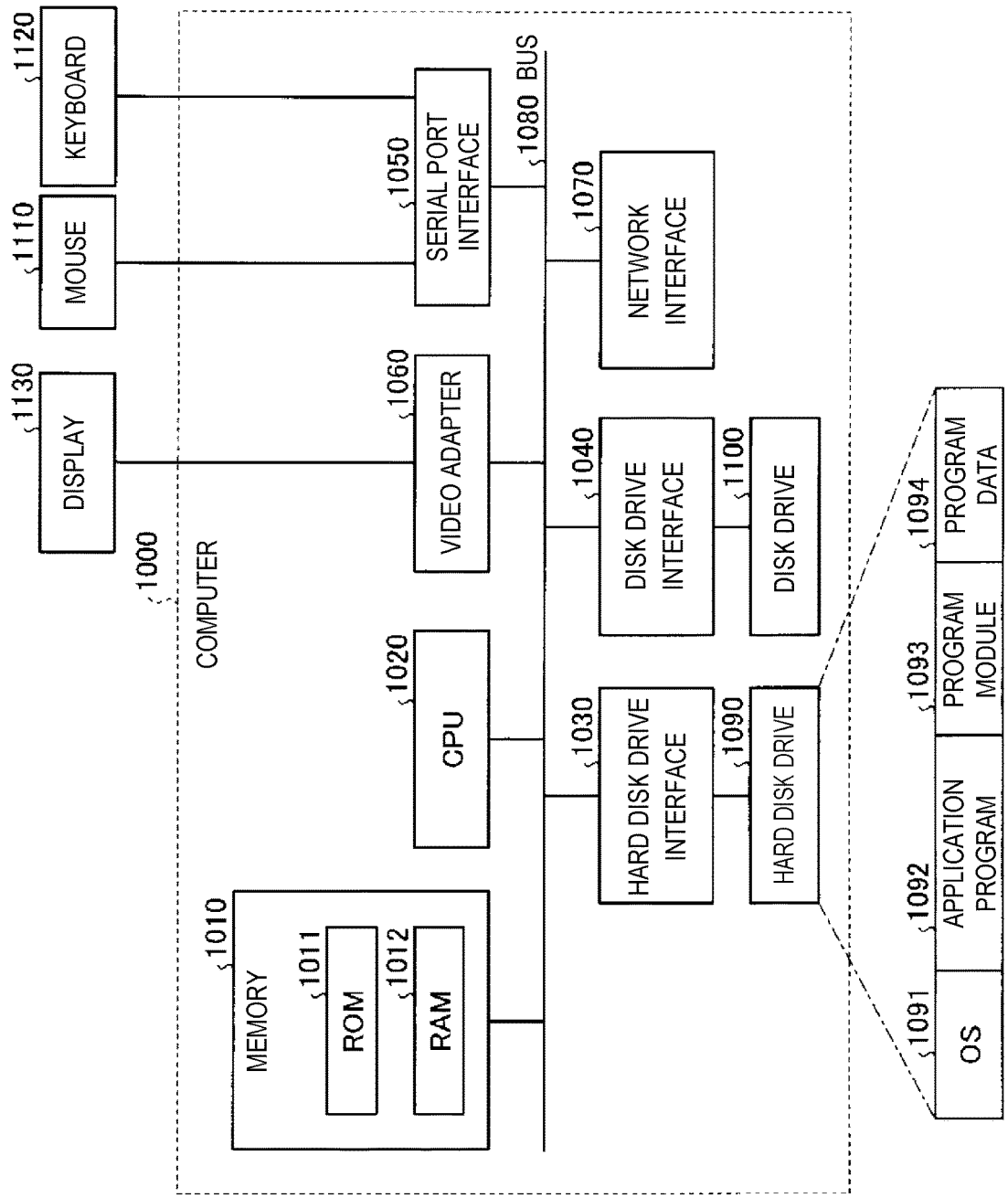
FIG. 15 is a diagram illustrating one example of a computer executing programs and thereby realizing an apparatus configuring the communication system of the first or second embodiment.

FIG. 15 is a diagram illustrating one example of a computer executing programs and thereby realizing an apparatus configuring the communication system of the first or second embodiment. A computer 1000 has a memory 1010 and a CPU 1020, for example. Further, the computer 1000 has a hard disk drive interface 1030, a disk drive interface 1040, a serial port interface 1050, a video adapter 1060, and a network interface 1070. These units are connected by a bus 1080.

The memory 1010 includes a ROM (read only memory) 1011 and a RAM (random access memory) 1012. The ROM 1011 stores a boot program such as a BIOS (basic input output system), for example. The hard disk drive interface 1030 is connected with a hard disk drive 1090. The disk drive interface 1040 is connected with a disk drive 1100. For example, a detachable storage medium such as a magnetic disk or an optical disk is inserted in the disk drive 1100. The serial port interface 1050 is connected with a mouse 1110 or a keyboard 1120, for example. The video adapter 1060 is connected with a display 1130, for example.

The hard disk drive 1090 stores an OS (operating system) 1091, an application program 1092, a program module 1093, and a program data 1094, for example. That is, a program providing each process of the apparatus configuring the communication system of the first or second embodiment is implemented as the program module 1093 in which codes executable by a computer are described. The program module 1093 is stored in the hard disk drive 1090, for example. For example, the program module 1093 for executing the same processes as a functional configuration in the apparatus configuring the communication system of the first or second embodiment is stored in the hard disk drive 1090. Note that the hard disk drive 1090 may be substituted by a SSD (solid state drive).

Further, setting data used in the processes of the above-described embodiments are stored, as the program data 1094, in the memory 1010 or the hard disk drive 1090, for example. Then, the CPU 1020 reads out the program module 1093 or program data 1094 stored in the memory 1010 or hard disk drive 1090 to the RAM 1012 as needed and executes it.

Note that the program module 1093 and the program data 1094 are not limited to a case of being stored in the hard disk drive 1090 but may be stored in a detachable storage medium and be read out by the CPU 1020 via the disk drive 1100 or the like, for example. Alternatively, the program module 1093 and the program data 1094 may be stored in another computer connected via a network (such as LAN or WAN (wide area network)). Further, the program module 1093 and the program data 1094 may be read out from another computer by the CPU 1020 via the network interface 1070.

In the foregoing, descriptions have been made about the embodiments to which the invention made by the present inventor is applied; however, the present invention is not limited by descriptions and drawings representing a portion of the disclosure of the present invention by the present embodiments. That is, all of other embodiments, practical examples, and applied techniques, and so forth made by a person skilled in the art based on the embodiments are included in the scope of the present invention.

REFERENCE SIGNS LIST

10 IoT device
11 sensor
12 re-transmission timer
13 alive monitoring timer
14, 23 communication unit
15 data transmission trigger monitoring unit
16 sleep management unit
20, 220 IoT device accommodation GW
21, 221 alive monitoring time management unit
224 system condition monitoring unit

The invention claimed is:

1. A gateway accommodating a plurality of IoT (Internet of things) devices, the gateway comprising one or more processors configured to:
set a monitoring cycle for each of the plurality of IoT devices to transmit a message to the gateway in accordance with the monitoring cycle, wherein each IoT device is associated with a respective monitoring cycle, wherein setting the monitoring cycle for each IoT device comprises:
determining a system load on the gateway, for each IoT device:
in response to determining that the system load is equal to or less than a predetermined threshold value, setting the respective monitoring cycle of the IoT device to be the same as a previous respective monitoring cycle of the IoT device, and
in response to determining that the system load exceeds the predetermined threshold value, setting the respective monitoring cycle of the IoT device to be longer than the previous respective monitoring cycle of the IoT device; and
transmit the respective monitoring cycle of the IoT device to the IoT device.

2. The gateway according to claim 1, wherein the one or more processors are further configured to monitor the system load on the gateway.

3. The gateway according to claim 2, wherein the one or more processors are further configured to
set stop of transmission of an alive monitoring message for the IoT device in a case where the system load exceeds the predetermined threshold value.

4. A communication system comprising: a plurality of IoT (Internet of things) devices; and a gateway accommodating the plurality of IoT devices,
wherein the gateway includes one or more processors configured to:
set a monitoring cycle for each of the plurality of IoT devices to transmit a message to the gateway in accordance with the monitoring cycle, wherein each IoT device is associated with a respective monitoring cycle, wherein setting the monitoring cycle for each IoT device comprises:
determining a system load on the gateway,
for each IoT device:
in response to determining that the system load is equal to or less than a predetermined threshold value, setting the respective monitoring cycle of the IoT device to be the same as a previous respective monitoring cycle of the IoT device, and
in response to determining that the system load exceeds the predetermined threshold value, setting the respective monitoring cycle of the IoT device to be longer than the previous respective monitoring cycle of the IoT device; and
transmit the respective monitoring cycle of the IoT device to the IoT device, and
wherein the IoT device includes
one or more processors configured to transmit a message to the gateway in accordance with the monitoring cycle.

5. The communication system according to claim 4, wherein the one or more processors of the gateway are further configured to monitor the system load on the gateway.

6. The communication system according to claim 5, wherein the one or more processors of the gateway are further configured to
set stop of transmission of an alive monitoring message for the IoT device in a case where the system load exceeds the predetermined threshold value.

7. The communication system according to claim 4, wherein
the one or more processors of the IoT device are further configured to cause the IoT device to go into a sleep state in a period except for a communication time in accordance with the monitoring cycle.

8. A communication method being executed by a gateway accommodating a plurality of IoT (Internet of things) devices, the communication method comprising:
setting a monitoring cycle for each of the plurality of IoT devices to transmit a message to the gateway in accordance with the monitoring cycle, wherein each IoT device is associated with a respective monitoring cycle, wherein setting the monitoring cycle for each IoT device comprises;
determining a system load on the gateway,
for each IoT device:
in response to determining that the system load is equal to or less than a predetermined threshold value, setting the respective monitoring cycle of the IoT device to be the same as a previous respective monitoring cycle of the IoT device, and
in response to determining that the system load exceeds the predetermined threshold value, setting the respective monitoring cycle of the IoT device to be longer than the previous respective monitoring cycle of the IoT device; and
transmitting the monitoring cycle to the IoT device.

9. The communication method according to claim 8, further comprising:
monitoring the system load on the gateway.

10. The communication method according to claim 9, further comprising:

setting stop of transmission of an alive monitoring message for the IoT device in a case where the system load exceeds the predetermined threshold value.

\* \* \* \* \*